June 1, 1965  R. E. McCANDLISH  3,186,520
HOLD-DOWN DEVICE
Filed April 17, 1963
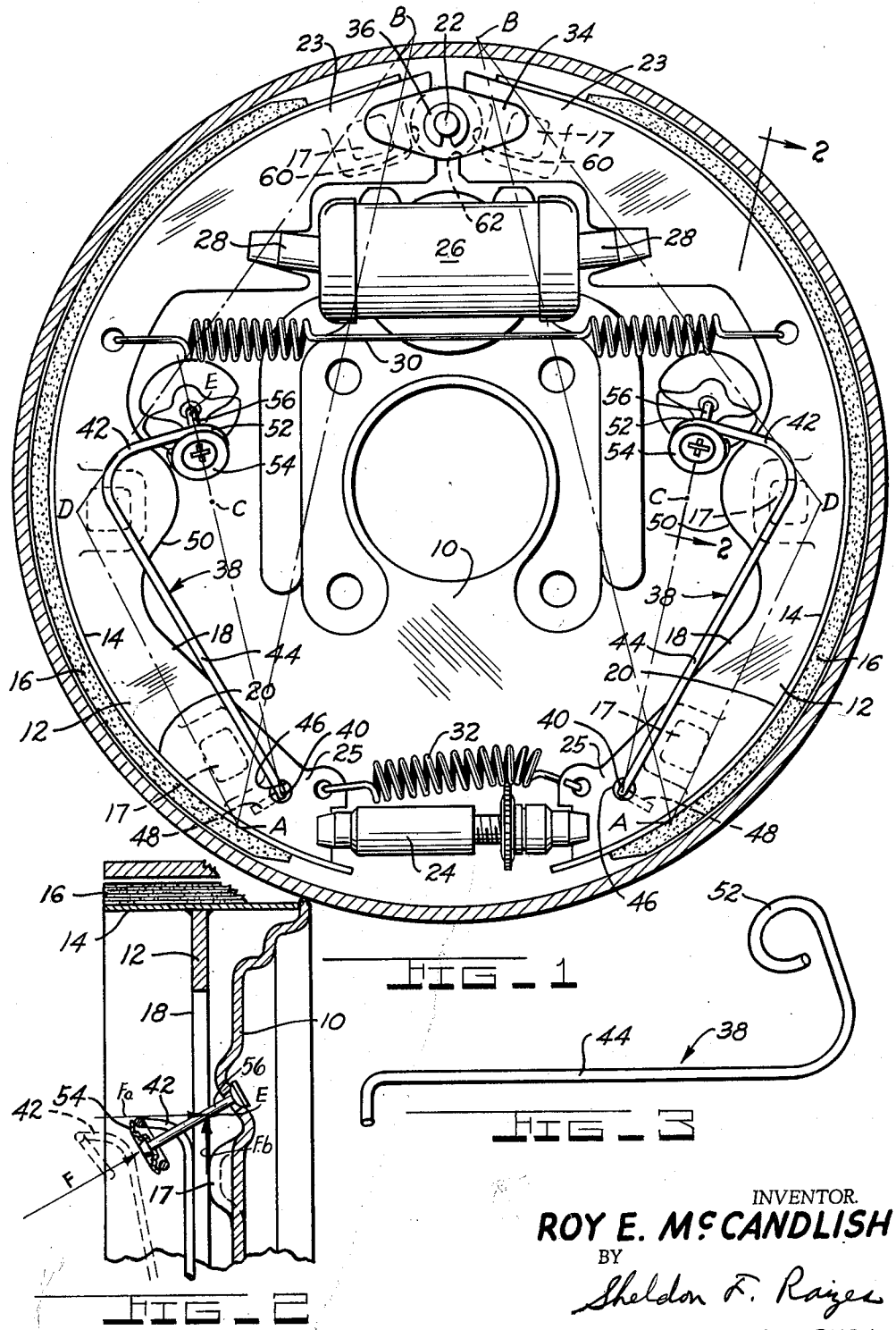
INVENTOR.
ROY E. McCANDLISH.
BY
Sheldon F. Raizer
ATTORNEY.

United States Patent Office 3,186,520
Patented June 1, 1965

3,186,520
HOLD DOWN DEVICE
Roy E. McCandlish, South Bend, Ind., assignor to The Bendix Corporation, South Bend, Ind., a corporation of Delaware
Filed Apr. 17, 1963, Ser. No. 273,745
8 Claims. (Cl. 188—78)

This invention relates to a drum brake. More particularly, this invention relates to a hold down device for biasing a brake shoe of the brake into engagement with a backing plate of said brake and biasing the brake shoe in an upwards direction.

An object of this invention is to provide a drum brake with a hold down device which biases a brake shoe toward the backing plate and also provides a lifting force on said shoe.

Another object of the invention is to provide a drum brake with a hold down device which will bias a brake shoe against the backing plate of the brake and provide a lifting force on said shoe with the resultant of the forces exerted by the down down device passing through a point between the axis of rotation of said drum and a portion of the inner edge of the brake shoe.

A further object of the invention is to provide a hold down device for effecting the above objects and which is economical to produce.

Other objects of the invention will become apparent from the following description with reference to the drawings wherein:

FIGURE 1 is a front elevational view of a brake assembly;
FIGURE 2 is a view along section line 2—2; and
FIGURE 3 is a view of a hold down spring.

Referring to the drawing, a backing plate 10 is adapted to be attached to a fixed part of a vehicle, as for instance, an axle flange (not shown). A pair of brake shoes 12 are slidably mounted on said plate and each comprises a rim 14 with a brake lining 16 attached thereto and a transverse web 18 attached at its other edge 20 to the rim. The shoes are supported on the backing plate by their webs which rest on pads 17. An anchor pin 22 is provided on the backing plate adjacent to one pair of brake shoe ends 23 and an adjusting strut 24 interconnects the other pair of brake shoe ends 25. A fluid motor 26 is fixedly mounted to the backing plate and has a pair of links 28 providing a thrust connection between the fluid motor 26 and the brake shoes on actuation of the brake. A shoe to shoe return spring 30 attached to each brake shoe web retracts the brake shoes into engagement with the anchor pin 22 and a spring 32 interconnects the brake shoe ends 25 and maintains the ends 25 in engagement with the adjuster strut 24. A retainer plate 34 is secured to the anchor pin 22 by a C-clip 36 and serves to limit axial outward movement of the brake shoe ends 23.

Each shoe is provided with a cantilevered hold down device 38 which is a wire having a main body portion 44 located between and integral with an anchoring arm 40 and an arm 42 bent in opposite directions. The arm 40 extends into an opening 46 of the web and has portion 48 bearing on the inwardly facing surface of the web. The portions of the wire member near and including the juncture of the arms 40 and 42 with the main body member 44 bear on the outwardly facing surface of the web. The arm 42 extends in a direction which is inwardly away from the inner edge 50 of the web and ends in a closed loop 52 which receives a retainer washer 54 thereon. A link 56 slants upwardly away from the loop 52 toward the backing plate and is pivotally mounted to the backing plate 10 and is received through an opening in the washer to be retained thereby.

Referring to FIG. 2, the arm 42 is shown dotted and in full; the former representing the unstressed condition of the arm 42 prior to connecting the pin 56 thereto, and the latter representing the normally stressed position of the arm 42. The arm 42 transfers the force exerted thereon by the pin 56 to the brake shoe web 18 around the areas of the juncture between the main body portion 44 and the arms 40 and 42 and at the area on which portion 48 of arm 40 bears against the web. The main body portion 44 is in torsion which allows the efficient use of material in the form of a wire.

The hold-down device exerts a resultant force F on the brake shoe. The path of the resultant force F is determined by the effective connecting point between the link 56 and the arm 42 and the effective connecting point between the link 56 and the backing plate. The resultant force F may be resolved into an axial component $F_a$ and an uplifting component $F_b$. The axial component $F_a$ effects a hold-down force on the shoe which in turn imposes the same axial force on the pads 17. The effective location of the axial component $F_a$ acting on the shoe and pads 17 occurs at the intersection of the path of the resultant force F and the plane of the pads supporting the shoe which is at point E.

The use of a hold down device which exerts a resultant axial hold down force on the brake shoe which passes as near as possible to the center of gravity of the supporting platform therefor is especially important when a return spring such as spring 30 interconnecting the shoes is used, since the force exerted on the shoes by the return spring is co-planar with the center line of the web of the shoe with no lifting effect thereon. If the hold down load was distributed to the pads where one pad would take a much heavier load than the other pad, then it would require a very small disturbing force to lift the shoe off the latter pad resulting in uneven lining wear, dragging, etc. Thus, the axial force exerted by the hold down device 38 on the shoe must be spread as equally as possible to the pads 17. If the resultant axial force exerted on the shoe by the hold down device passes through the center of gravity C of the supporting platform defined by the pads 17, which is also the geometric center C of the triangle ABD formed by lines connecting the pads 17, an equal hold down load will be exerted on each pad 17 by the shoe. Due to the backing plate configuration it may not be possible to locate the link 56 at the exact center of gravity C but will be offset slightly therefrom as shown at E in FIG. 1.

It has been found upon brake application, that when one of the shoe ends 23 initially engages with the anchor pin 22 a "klunk" noise is heard. This is due to the curved bearing portion 60 of the brake shoe ends 23 engaging the anchor pin 22 upon initial contact of the end 23 with the pin. The "klunk" noise may be substantially reduced by the initial contact of the brake shoe end 23 with the anchor pin 22 being at the inner end 62 of the brake shoe end 23 prior to the brake shoe end 23 sliding on the anchor pin 22 to bring the curved bearing portion 60 into contact with the anchor pin 22. Thus a lifting force must be exerted on the shoes so the inner end 62 will initially engage the anchor pin upon each brake application. The vertical component $F_b$ of the force F acting on the shoes through the hold down device 38 provides this lifting action on the shoes.

Upon actuation of the fluid motor 26, the brake shoes 12 are spread into engagement with the brake drum 58. The link 56 will pivot about its connection to the backing plate. If there is a limited amount of space between the backing plate 10 and the web of the shoe 18, as for instance when the shoes are supported on the backing plate by their webs or when the shoes are supported on the backing plate by their rims and the width of the rims limits the space between the backing plate and web, a short link 56 must be used. When a short link is used, the link may stop pivoting before the lining engages the drum. If the hold down device 38 was fixedly secured to the web of the shoe 12 then the lining would be unable to engage the drum without damage to the link or hold down device 38. However, since the arm 40 of the hold down device 38 is pivotally connected to the web 18 and the main body portion 44 and arm 42 slidably bear on the web 18, relative movement will occur between the hold down device and the shoe when the link stops pivoting thus allowing the lining 16 to engage the brake drum. Obviously, as the linings wear and the shoes retract to a new adjusted position, the hold down device will assume a different position relative to the web 18 once the link ceases to pivot about its connection to the backing plate. The portions of the hold down device 38 near and including the junctures of the arms with the main body portion 44 will always bear on the web throughout wear of the linings. Obviously, if a long enough link were used it would not be necessary to have relative movement between the hold down device and the web 18 although such might still be desirable.

Thus it can be seen that the hold down device 38 serves two purposes: that of providing the hold down force on a brake shoe for holding the brake shoe against the backing plate and that of providing a lifting force on the brake shoe.

An inherent feature of the hold down device is that it requires very little space extending axially outward of the web in contrast to a conventional hold down coil spring. This is especially advantageous when a narrow shoe is used and/or when a steel rib is used in a drum back which projects axially toward the web and beyond the edge of the rim of the shoe.

Although specific embodiments have been described, I do not wish to be limited to the particular construction described, and it is my intention to cover hereby all novel adaptations, modifications and arrangements thereof, which come within the practice of those skilled in the art to which the invention relates.

I claim:

1. In a drum brake: a drum rotatable about a horizontal axis, a support member, a brake shoe slidably supported by said support member for engagement with said drum and comprising a rim with friction material attached thereto and a web transverse to said rim and attached at its outer edge to said rim; a cantilevered hold-down device anchored at one end on said shoe and having a portion thereof axially spaced from the plane of said web in a direction away from said support member, and means connected to said portion of said hold-down device and said support member for stressing said hold-down device to impart perpendicular force components on said shoe, one of said components acting in a horizontal direction toward said support member to hold said shoe against said support member and the other of said components acting upwards to provide a lifting force on said shoe, said connecting means being so arranged and located that the net resultant force, in a direction toward said support member, exerted on said brake shoe by said hold down device passes between a portion of the inner edge of said web and said axis.

2. In a drum brake: a drum rotatable about a horizontal axis, a support member, a brake shoe slidably mounted on said support member for engagement with said drum and comprising a rim with friction material attached thereto and a web transverse to said rim and attached at its outer edge to said rim, a cantilevered hold down device anchored at one end on said shoe and having a portion thereof axially spaced from the plane of said web in a direction away from said support member, a rigid member extending towards said support member in an upwards direction and passing between a portion of the inner edge of said web and said axis, said rigid member being operatively connected to said portion of said hold down device and to said support member for stressing said resilient member to impart perpendicular force components on said shoe, one of said components acting in a horizontal direction toward said support member to hold said shoe thereagainst and the other of said components acting upwards to provide a lifting force on said shoe.

3. The structure as recited in claim 1 wherein said connecting means comprises a rigid member attached at one end to said hold down device and pivotally attached at its other end to said support member.

4. The structure as recited in claim 2 wherein: said hold down device comprises a resilient member having a main body portion located between arms which are bent away from said body portion in generally opposite directions, one of said arms has a pivotal connection with said web and is held against axial movement by said web and the other arm extends inwardly away from a portion of said rim and being connected to said rigid member, and at least a part of said main body portion slidably engages the outwardly facing surface of said web.

5. In a drum brake: a drum rotatable about a horizontal axis, a support member, a brake shoe slidably mounted on said support member for engagement with said drum and comprising a rim with friction material attached thereto and a web transverse to the rim and attached at its outer edge to said rim, a resilient wire member having arms bent in generally opposite directions and a main body portion therebetween, an opening in the web of one of said shoes, one of said arms extending through said opening and providing a pivotal connection between said wire member and said web, the other arm terminating at a location axially spaced from the plane of said web in a direction away from said support member, said main body portion slidably engaging the outwardly facing surface of said web, a rigid member pivotally connected at one end to said support member and connected at its other end to the free end of said other arm to stress said wire member, said rigid member extending toward said support member in an upwards direction, whereby said wire member biases said shoe toward said support member and provides a lifting force on said shoe.

6. In a drum brake: a drum rotatable about a horizontal axis, a support member, a brake shoe slidably mounted on said support member for engagement with said drum and comprising a rim with friction material attached thereto and a web transverse to said rim and attached at its outer edge to said rim, a resilient member comprising a main body portion slidably engaging the surface of the web which faces away from said support member, one end of said main body portion being pivotally connected to and held against axial movement by said web, an arm at the other end of said main body portion bent away therefrom in a direction which is transverse to said main body portion and away from said support member, said arm terminating at a location which is axially spaced from the plane of said web, a rigid member operatively connected at one end to said support member and at its other end to said arm of said resilient member for stressing said resilient member, said rigid member extending in an upward direction toward said support member from said arm of said resilient member, whereby perpendicular force components are imparted on said shoe, one of said components acting in a horizontal direction toward said support member to hold said shoe thereagainst and the other of said components acting upwardly to provide a lifting force on said shoe.

7. The structure as recited in claim 6 wherein said rigid member is pivotally attached to said support member.

8. The structure as recited in claim 3 wherein: said hold down device comprises a resilient member having a main body portion located between arms which are bent away from said body portion, one of said arms has a pivotal connection with said web and is held against axial movement by said web and the other arm extends inwardly away from a portion of said rim and being connected to said one end of said rigid member, at least a portion of said main body portion slidably engages the outwardly facing surface of said web.

References Cited by the Examiner
UNITED STATES PATENTS
3,061,051  10/52  Swift _____ 188—78.9

ARTHUR L. LA POINT, *Primary Examiner.*
RALPH D. BLAKESLEE, *Examiner.*